May 23, 1961  I. ORTEGA ET AL  2,985,479
MOTOR VEHICLE SIDE AND TOP STABILIZING WHEELS
Filed March 10, 1958  2 Sheets-Sheet 1

INVENTORS
ISODORO ORTEGA
ALBERT WALLACE
BY
Henry J. F. Metzler
ATTORNEY

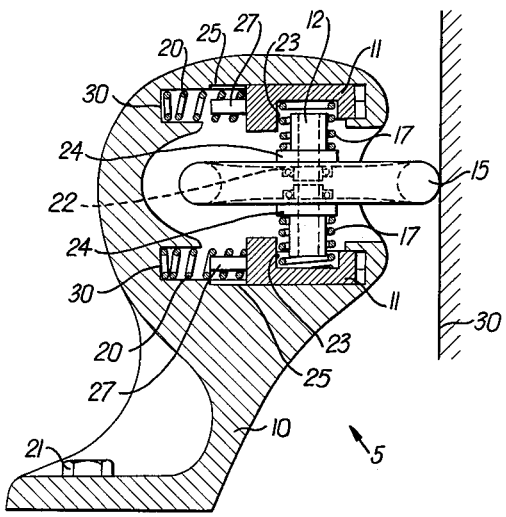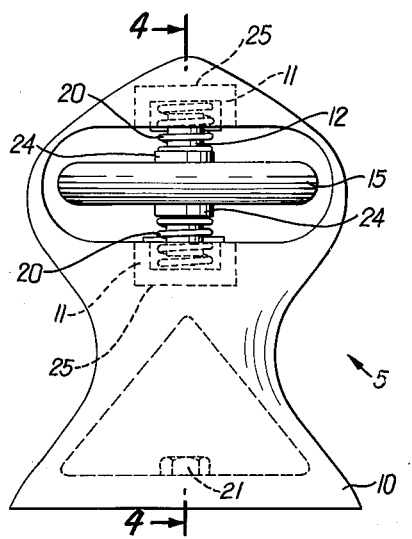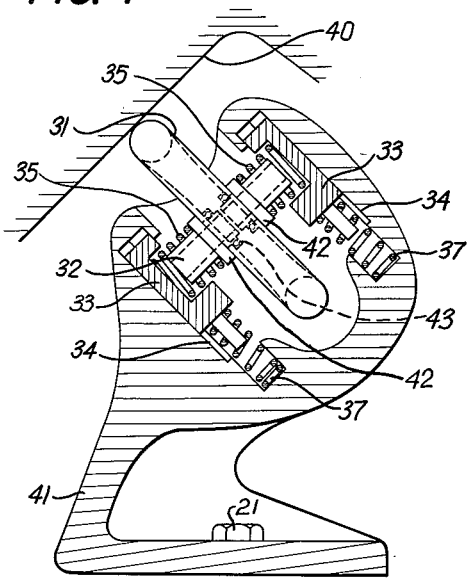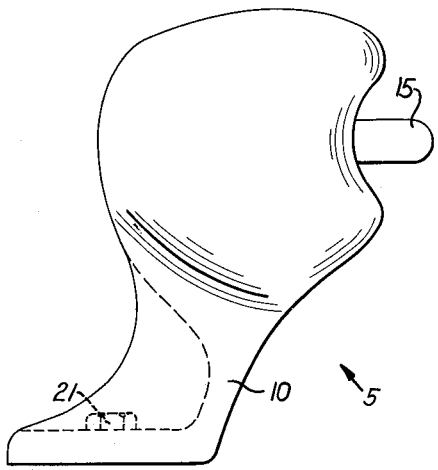

United States Patent Office 2,985,479
Patented May 23, 1961

2,985,479
MOTOR VEHICLE SIDE AND TOP STABILIZING WHEELS

Isidoro Ortega, 701 W. 177th St., New York, N.Y., and Albert Wallace, 1715 Longfellow Ave., Bronx, N.Y.

Filed Mar. 10, 1958, Ser. No. 720,246

3 Claims. (Cl. 293—1)

The present invention relates to improvements in high-speed land transportation and, more specifically, in a new lateral and overhead stabilizing and guiding arrangement for motor vehicles, high-speed railway cars and the like.

The travel speed of modern motor vehicles and the like is greatly restricted and reduced by safety requirements. For instance, in curves a speed reduction usually is necessary for preventing centrifugal forces from causing a vehicle to jump or to slide off the road, or to roll over sideways, or to collide with other on-coming vehicles. Moreover, if the road-surface is wet or covered with snow or ice the friction between the road surface and the four wheels, on which a vehicle normally travels, is reduced to such an extent that even very slight lateral or centrifugal forces make a driver lose control over his vehicle, causing many accidents.

Therefore, one object of the present invention is the provision of lateral and/or overhead guide means on a vehicle which are adapted for engaging guide rails along the road or wall portions of a tunnel or the like, for instance, such as disclosed by our co-pending patent applications Serial Numbers 722,182, filed Mar. 18, 1958, now abandoned, and 736,166 filed May 19, 1959, upon which was granted Patent Number 2,923,504 on February 2, 1960, in such a manner as to absorb any centrifugal pressure or lateral forces which might throw the vehicle off its intended path of locomotion, so that no speed reduction in curves or due to wet or slippery road surfaces will be necessary.

Another object of the present invention is the provision of lateral and/or overhead guide means on a vehicle which are constructed and arranged so as to yield to unevenness and slight irregularities of the aforementioned guide rails or tunnel walls, so that always a safe equal guiding support of a fast traveling vehicle is assured.

A further object of the present invention is the provision of lateral and/or overhead guide means on a vehicle which is comparatively small in size and light in weight, and which can be provided not only on newly manufactured vehicles, but which is so designed that it can be installed also in existing vehicles without any substantial structural alterations of the same.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing:

Fig. 3 is a detailed side view of a side-drive wheel unit;

Fig. 4 is a sectional view on the line 4—4 of Fig. 3;

Fig. 5 is a front view of the wheel unit of Figs. 3 and 4; and,

Fig. 6 is a vertical sectional view of an upwardly inclined guide wheel unit.

Similar reference characters refer to similar parts throughout the several views.

Figure 1:
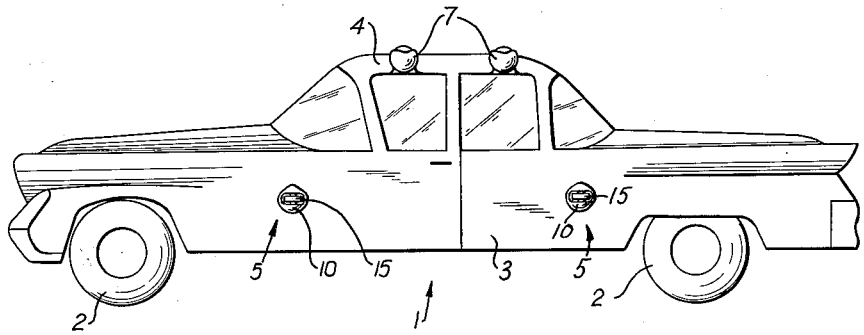
Figure 1 is a side view of a passenger automobile provided with my new and improved side-and-upright or overhead-drive.
Figure 2:
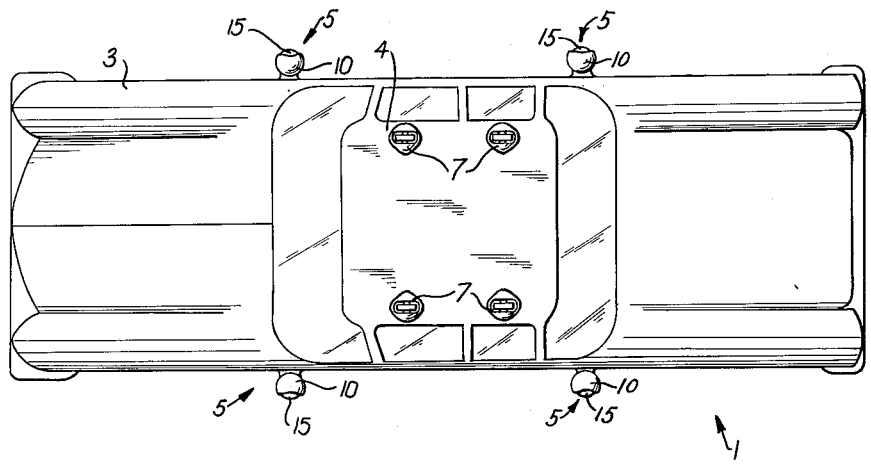
Fig. 2 is a top plan view of the same.

In Figs. 1 and 2 the numeral 1 denotes a passenger automobile of customary design having ordinary wheels 2, a body 3 and a roof 4. According to the present invention there are mounted on the body 3 close to its center of gravity on each side one or more laterally extending wheel units 5, and on the roof 4 are mounted one or two pairs of wheel units 7.

Referring now to Figs. 3, 4 and 5, each wheel unit 5 consists of a housing 10, a pair of sleds 11 slidably mounted in the housing 10, a shaft member 12, a wheel 15, and springs 17 and 20. Each housing 10 is secured to the body 3 of the vehicle 1 by means of screws 21 (Fig. 4) or by any other suitable means. The wheel 15 of each unit 5 is rotatable on the shaft member 12, and ball or roller bearing elements 22 preferably are interposed between the wheel 15 and the shaft element 12, for the purpose of reducing the friction to a minimum. Each sled 11 has a cup-shaped excavation 23 into which an end portion of a shaft element 12 is extended in such a manner that the same is laterally and axially movable therein. Increased shoulder portions 24 are provided at the shaft element 12 at both sides of the hub portion of the wheel 15, and the springs 17 are interposed between the shoulder portions 24 and the bottom sections of the excavations 23. The sleds 11 are slidable in channel portions 25 of the housing 10, and they have pin-shaped extensions 27 each of which is extended into an end portion of a spring 20. Each one of the other end portions of each spring 20 is extended into a cylindrical bore 30 in the housing 10, as may be seen in Fig. 4. Thus if a wheel 15 is running on a lateral guide or on a wall portion 30 (Fig. 4), any unevenness of the same will only cause a sliding movement of the sleds 11 on the housing 10, so as to avoid lateral movements of the vehicle 1. Likewise, any up and down movement of the vehicle 1 will only cause a contraction or an expansion of the springs 17 and a vertical movement of the parts 12 and 15 relative to the housing 10, so as to reduce, or to eliminate completely any vertical friction between the wheels 15 and the wall or guide 30.

The guide wheel unit 7 of Fig. 6 is substantially the same as the wheel unit 5, only the wheel 31 and the shaft element 32 as well as the sleds 33, the channel portions 34 and the springs 35 and 37 are inclined corresponding to the inclination of the guide member 40 on which the wheel 31 travels. In this case the housing 41 is shaped so as to allow the aforementioned inclined arrangement of the parts 31 to 37, and increased shoulder portions 42 are provided on the shaft member 32 at both sides of the wheel 31. Ball or roller bearings 43 also are interposed between the wheel 31 and the member 32.

While any suitable guide rails, walls, tunnel constructions or the like may be used in connection with our above described side-and-upright-drive, we prefer to use a specially designed construction which is disclosed by our co-pending patent applications.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described our said invention, what we claim as new and desire to secure by Letters Patent is:

1. In an automotive vehicle having a vehicle body with side portions and a roof, and running on wheels; a stabilizer arrangement comprising bracket members mounted on outer side portions of said vehicle body and roof and each bracket member having a base portion and a housing portion which is open at one side and closed at the other side and has top and bottom sections in spaced relation to each other and a channel in each top and bottom section within said housing being right-angularly disposed to the side at which the housing portion is open, a pair of sled elements being slidable in said channels of each bracket member, a shaft element having two ends each of which extends into one of said sled elements in each bracket member, a wheel within each housing portion rotatable on each shaft element and having a rim portion extending beyond the open side of said bracket member, first resilient elements interposed between each one of said sled elements and each one of said wheels, and second resilient elements positioned along the axes of said channels being interposed between each one of said sled elements and the closed side of the housing portion of each bracket member, said wheels being constructed and arranged for engaging guide rails and surfaces provided along a path of travel for the vehicle.

2. In an automotive vehicle having a body with side portions and a roof, and running on wheels; a stabilizer arrangement comprising first bracket members exteriorly mounted on the side portions of said body, and second bracket members mounted on the roof of said body; each bracket member having a base portion and a housing portion which is open at one side and closed at the opposite side and has top and bottom sections in spaced relation to each other and a channel extended through each top and bottom section within said housing being right-augularly disposed to the side at which the housing portion is open, a sled element being slidable in each channel of each bracket member, a shaft element having two end portions each of which extends into one of said sled elements in each bracket member, a wheel within each housing portion of each bracket member being rotatable on each shaft element and having a rim portion extending beyond the open side of the bracket member, first resilient elements interposed between each one of said sled elements and each one of said wheels, and second resilient elements positioned along the axes of said channels being interposed between each one of said sled elements and the closed side of the housing portion of each bracket member, said wheels being constructed and arranged for engaging guide rails and surfaces provided along the path of travel of the vehicle.

3. In an automotive vehicle having a body with side portions and a roof, and running on wheels; a stabilizer arrangement comprising first bracket members exteriorly mounted on the side portions of said vehicle body and having base and housing portions rightangularly disposed to each other, and second bracket members mounted on the roof of said vehicle body and having base and housing portions obliquely disposed to each other; each housing portion of said bracket members being open at one side and closed at the opposite side and having top and bottom sections in spaced relation to each other and provided with opposite open channels which within said housing portion are rightangularly disposed to the open side thereof, a sled slidable in each one of said channels having a cup-shaped portion, a shaft having shoulder portions and a main portion intermediate said shoulder portions and having also end portions each of which extends into a cup-shaped portion of a sled in each housing portion of said bracket member, a wheel rotatable on the main portion of each shaft within each housing portion of each bracket member having a rim portion extending beyond the open side of the housing portion, first resilient means interposed between the cup-shaped portion of each sled and the shoulder portions of each shaft, and second resilient means interposed between each one of said sleds and the closed side of the housing portion of each bracket member and being positioned along the axes of said channels, said wheels being constructed and arranged for engaging guide rails and surfaces provided along a path of travel for the vehicle.

References Cited in the file of this patent

UNITED STATES PATENTS

| | | |
|---|---|---|
| 368,515 | Chadeayne | Aug. 16, 1887 |
| 862,157 | Healy | Aug. 6, 1907 |
| 1,106,507 | Grose | Aug. 11, 1914 |
| 1,682,974 | Lukens | Sept. 4, 1928 |
| 1,774,916 | Doherty | Sept. 2, 1930 |
| 1,900,914 | Cornet | Mar. 14, 1933 |
| 2,153,896 | Mohar | Apr. 11, 1939 |
| 2,168,908 | Lewis | Aug. 8, 1939 |
| 2,177,112 | Johnstone | Oct. 24, 1939 |
| 2,239,422 | Hayashi | Apr. 22, 1941 |
| 2,397,064 | Verner | Mar. 19, 1946 |
| 2,541,364 | Jurasevich | Feb. 13, 1951 |
| 2,834,608 | Wixson | May 13, 1958 |

FOREIGN PATENTS

| | | |
|---|---|---|
| 938,355 | Germany | Jan. 26, 1956 |